(12) United States Patent
Nishita

(10) Patent No.: US 11,500,096 B2
(45) Date of Patent: Nov. 15, 2022

(54) SURVEYING INSTRUMENT

(71) Applicant: TOPCON Corporation, Tokyo-to (JP)

(72) Inventor: Nobuyuki Nishita, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 525 days.

(21) Appl. No.: 16/662,099

(22) Filed: Oct. 24, 2019

(65) Prior Publication Data

US 2020/0132840 A1  Apr. 30, 2020

(30) Foreign Application Priority Data

Oct. 25, 2018 (JP) ............................. JP2018-201339

(51) Int. Cl.
*G01S 17/42* (2006.01)
*G01C 15/00* (2006.01)

(52) U.S. Cl.
CPC ............ *G01S 17/42* (2013.01); *G01C 15/006* (2013.01); *G01C 15/008* (2013.01)

(58) Field of Classification Search
CPC ...................................................... G01S 17/42
See application file for complete search history.

(56) References Cited

U.S. PATENT DOCUMENTS

| | | | |
|---|---|---|---|
| 6,124,932 A | 9/2000 | Tax et al. | |
| 7,289,876 B2 | 10/2007 | Lussen et al. | |
| 8,279,430 B2* | 10/2012 | Dold | G01S 17/86 356/139.08 |
| 9,897,436 B2* | 2/2018 | Ohtomo | G06T 11/60 |
| 10,048,377 B2* | 8/2018 | Ohtomo | G01C 9/06 |
| 10,088,307 B2* | 10/2018 | Ohtomo | G01S 17/86 |
| 10,101,441 B2* | 10/2018 | Ohtomo | G01S 7/4865 |
| 10,222,476 B2* | 3/2019 | Herbst | G01S 17/42 |

(Continued)

FOREIGN PATENT DOCUMENTS

| | | |
|---|---|---|
| JP | 2016-151422 A | 8/2016 |
| JP | 2016-151423 A | 8/2016 |

(Continued)

OTHER PUBLICATIONS

European communication dated Aug. 4, 2020 in corresponding European patent application No. 19204503.7.

*Primary Examiner* — Michael A Berns
(74) *Attorney, Agent, or Firm* — Nields, Lemack & Frame, LLC

(57) ABSTRACT

A surveying instrument comprises a distance measuring module configured to perform a distance measurement of an objects to be measured, an optical axis deflector which is provided on a distance measuring optical axis and enables to two-dimensionally deflect the distance measuring optical axis, an arithmetic control module configured to control a deflecting action of the optical axis deflector and a distance measuring action of the distance measuring module, and a display module configured to display calculation results by the arithmetic control module, and wherein the arithmetic control module is configured to scan at least one plane of the objects to be measured in a predetermined scan pattern in at least one cycle by the optical axis deflector, to calculate parameters of the plane based on a measurement result of point cloud data acquired along a locus of a scan, and to display the calculated parameters on the display module.

14 Claims, 10 Drawing Sheets

(56) References Cited

U.S. PATENT DOCUMENTS

| | | | |
|---|---|---|---|
| 10,520,307 B2* | 12/2019 | Ohtomo | ............... G01S 17/86 |
| 10,901,070 B2* | 1/2021 | Lüthi | ............... G01S 7/4802 |
| 2012/0120391 A1 | 5/2012 | Dold et al. | |
| 2016/0238385 A1 | 8/2016 | Ohtomo et al. | |
| 2016/0238708 A1 | 8/2016 | Ohtomo et al. | |
| 2016/0259039 A1 | 9/2016 | Ohtomo et al. | |
| 2016/0327647 A1 | 11/2016 | Herbst et al. | |
| 2017/0227357 A1 | 8/2017 | Ohtomo et al. | |
| 2017/0350692 A1 | 12/2017 | Ohtomo et al. | |
| 2018/0224527 A1 | 8/2018 | Lüthi et al. | |

FOREIGN PATENT DOCUMENTS

| | | |
|---|---|---|
| JP | 2016-161411 A | 9/2016 |
| JP | 2017-142081 A | 8/2017 |

\* cited by examiner

SURVEYING INSTRUMENT

BACKGROUND OF THE INVENTION

The present invention relates to a surveying instrument which can measure an object to be measured.

In a building site, in case of installing a member such as a pillar at a predetermined position or in case of attaching a predetermined member to another member, it is necessary to install each member at a correct position in a correct attitude. Conventionally, each member is observed from two or more positions, and the member is visually guided to a predetermined position. For this reason, a plurality of workers are required for guiding the member, and hence the efficiency is poor.

Further, in order to guide each member to a predetermined position, a total station is used in some cases. In this case, the member is tracked while being measured by using the total station installed at a known position. Further, by comparing a measurement result with design drawing data, the member is guided to a predetermined position.

However, since the total station is a surveying instrument which performs a survey of a predetermined measuring point, only data of points can be acquired. For this reason, parameters such as an overall position and an attitude cannot be determined from a measurement result, and hence an accurate guiding is difficult.

Further, in order to guide each member to a predetermined position, a three-dimensional laser scanner is used in some cases. In this case, by acquiring point cloud data of the member by using the three-dimensional laser scanner, parameters such as an overall position or an attitude of the member can be obtained. Therefore, the member can be accurately guided.

However, in case of the laser scanner, in order to acquire point cloud data of an entire circumference, the number of data becomes enormous, and at takes time to acquire the point cloud data. Further, after acquiring all the point cloud data, a position and an attitude of the member must be detected by postprocessing. Therefore, it is difficult to carry out a work in real time.

SUMMARY OF THE INVENTION

It is an object of the present invention to provide a surveying instrument which enables to acquire parameters of an object to be measured in real time.

To attain the object as described above, a surveying instrument according to the present invention comprises a surveying instrument main body, wherein the surveying instrument main body comprises a distance measuring light projecting module configured to project a distance measuring light toward objects to be measured, a light receiving module configured to receive a reflected distance measuring light and to generate a light receiving signal, a distance measuring module configured to perform a distance measurement based on the light receiving signal, an optical axis deflector which is provided on a distance measuring optical axis and enables to two-dimensionally deflect the distance measuring optical axis, a projecting direction detecting module configured to detect a deflection angle of the distance measuring optical axis and to perform an angle measurement, an arithmetic control module configured to control a deflecting action of the optical axis deflector and a distance measuring action of the distance measuring module, and a display module configured to display calculation results by the arithmetic control module, and wherein the arithmetic control module is configured to scan at least one plane of the objects to be measured in a predetermined scan pattern in at least one cycle by the optical axis deflector, to calculate parameters of the plane based on a measurement result of point cloud data acquired along a locus of a scan, and to display the calculated parameters on the display module.

Further, in the surveying instrument according to a preferred embodiment, the parameters of the plane include an information of at least an inclination and an inclining direction of the plane.

Further, in the surveying instrument according to a preferred embodiment, the arithmetic control module is configured to calculate normal vectors of a plane on which three continuous measuring points in the point cloud data exist based on the three measuring points, to calculate the plane based on the normal vectors, and to calculate parameters of the plane based on a calculation result.

Further, in the surveying instrument according to a preferred embodiment, the arithmetic control module is configured to perform a scan with the distance measuring light in such a manner that the distance measuring light reaches two adjacent planes of the objects to be measured, to calculate parameters of the two planes and intersection lines on which the two planes cross each other based on a scan result, to calculate differences between the parameters and a reference position set in advance, and to guide the objects to be measured to the reference position based on the differences.

Further, in the surveying instrument according to a preferred embodiment, both two objects to be measured are positioned in a deflection range of the optical axis deflector, and the arithmetic control module is configured to alternately scan at least one surface of each of the two objects to be measured, to calculate parameters of the surfaces of the two objects to be measured based on a scan result, respectively, and to guide the two objects to be measured based on differences between each of the parameters in such a manner that the two objects to be measured have a predetermined positional relationship.

Further, in the surveying instrument according to a preferred embodiment, the parameters of the intersect ion line include an information of at least an inclination and an inclining direction of the intersection lines.

Further, in the surveying instrument according to a preferred embodiment, the optical axis deflector comprises a pair of rotatable optical prisms and motors configured to individually independently rotate the optical prisms, and the arithmetic control module is configured to control a rotating direction, a rotating speed, and a rotation ratio of the pair of optical prisms by a driving control of the motors, to control a deflection of the distance measuring optical axis by the optical axis deflector, and to make the distance measuring lights two-dimensionally scan.

Further, the surveying instrument according to a preferred embodiment further comprises a supporting portion configured to support the surveying instrument main body rotatably in an up-and-down direction and a left-and-right direction, a rotation driving module configured to rotate the surveying instrument main body in the up-and-down direction and the left-and-right direction, and an angle detector configured to detect an up-and-down angle and a left-and-right angle of the surveying instrument main body.

Further, the surveying instrument according to a preferred embodiment further comprises an image pickup module having an image pickup optical axis parallel to a reference optical axis which is the distance measuring optical axis in a state of not being deflected by the optical axis deflector, wherein the arithmetic control module is configured to select the objects to be measured which are to be measured based on an image acquired by the image pickup module.

Furthermore, in the surveying instrument according to a preferred embodiment, the arithmetic control module is configured to track the objects to be measured based on the image acquired by the image pickup module.

According to the present invention, the surveying instrument comprises a surveying instrument main body, wherein the surveying instrument main body comprises a distance measuring light projecting module configured to project a distance measuring light toward objects to be measured, a light receiving module configured to receive a reflected distance measuring light and to generate a light receiving signal, a distance measuring module configured to perform a distance measurement based on the light receiving signal, an optical axis deflector which is provided on a distance measuring optical axis and enables to two-dimensionally deflect the distance measuring optical axis, a projecting direction detecting module configured to detect a deflection angle of the distance measuring optical axis and to perform an angle measurement, an arithmetic control module configured to control a deflecting action of the optical axis deflector and a distance measuring action of the distance measuring module, and a display module configured to display calculation results by the arithmetic control module, and wherein the arithmetic control module is configured to scan at least one plane of the objects to be measured in a predetermined scan pattern in at least one cycle by the optical axis deflector, to calculate parameters of the plane based on a measurement result of point cloud data acquired along a locus of a scan, and to display the calculated parameters on the display module. As a result, an information as required can be directly acquired in real time, which results in an improvement in a workability.

DETAILED DESCRIPTION OF THE PREFERRED EMBODIMENT

A description will be given below on embodiments of the present invention by referring to the attached drawings.

A surveying instrument according to the first embodiment of the present invention will be described by FIG. 1, FIG. 2, and FIG. 3.

Figure 1:
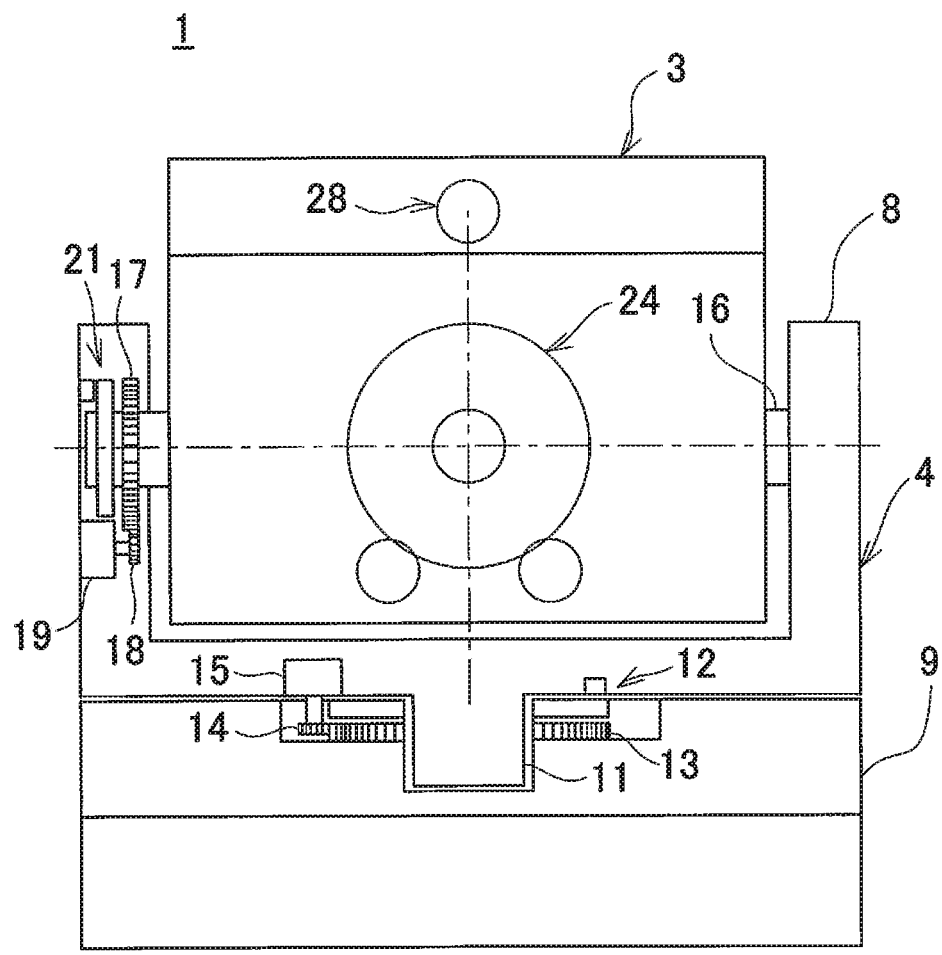
FIG. 1 is a front view to show a surveying instrument according to a first embodiment of the present invention.

In FIG. 1, a reference numeral 1 denotes a surveying instrument. The surveying instrument 1 is mainly constituted by a tripod (not shown) as a supporting device, a surveying instrument main body 3, and an installation base unit 4 as a supporting portion. The installation base unit 4 is mounted on an upper end of the tripod. The surveying instrument main body 3 is rotatably supported by the installation base unit 4 in an up-and-down direction and in a left-and-right direction, respectively.

Figure 2:
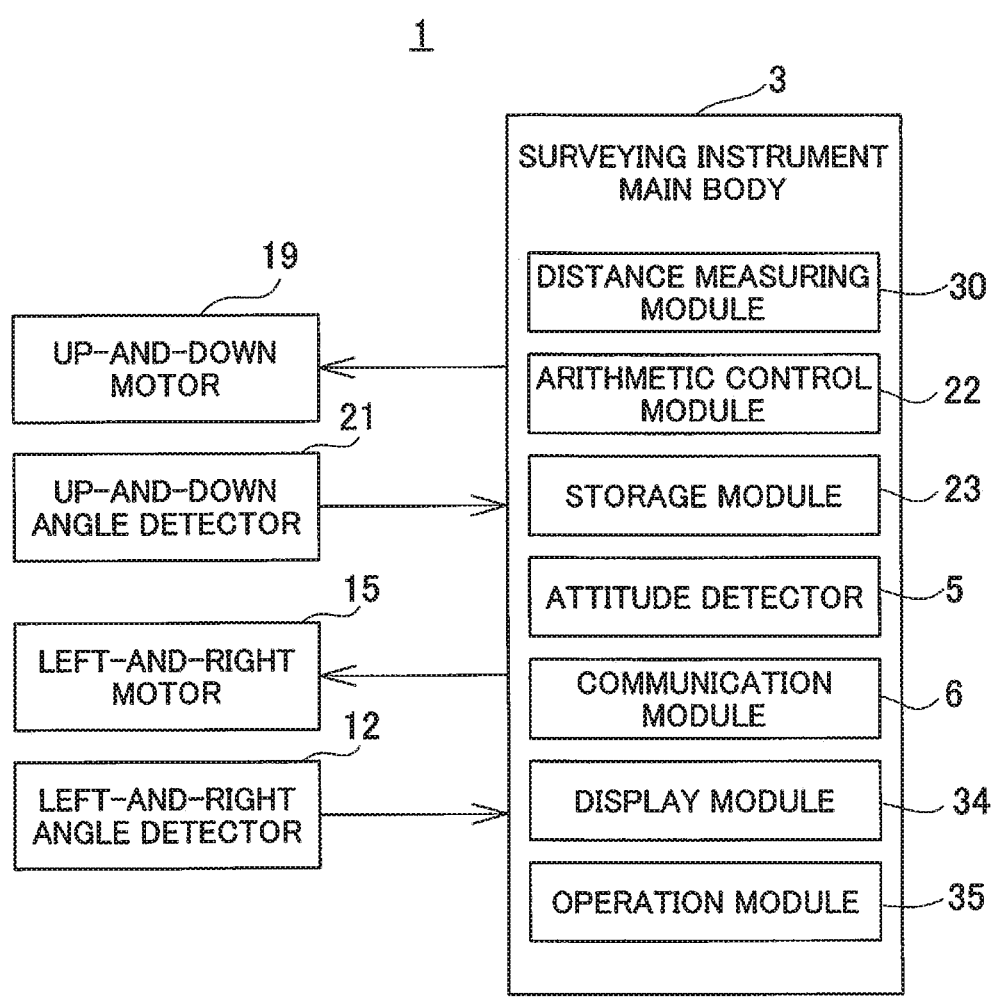
FIG. 2 is a schematical block diagram to show the surveying instrument according to the first embodiment of the present invention.
Figure 3:
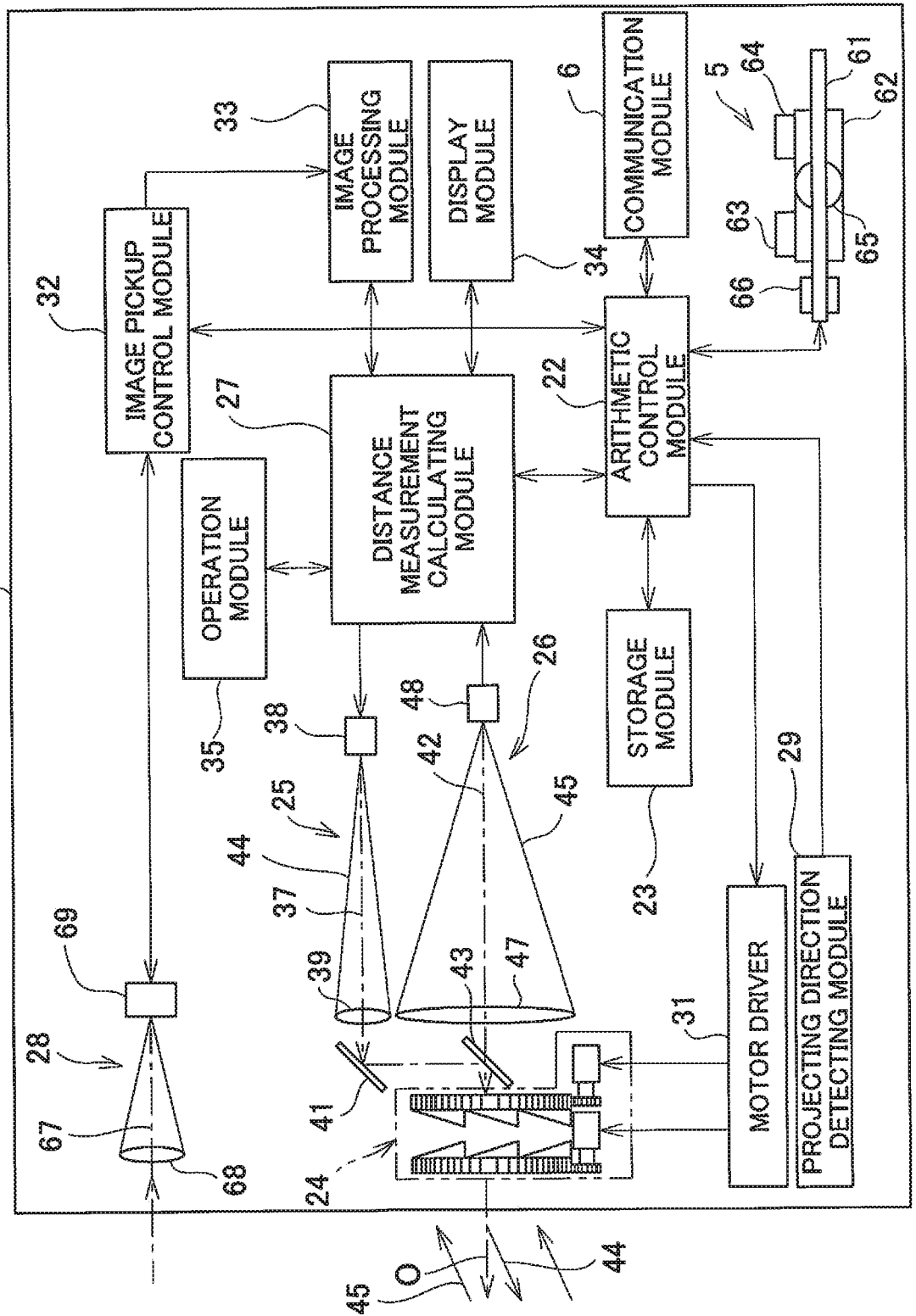
FIG. 3 is a schematical block diagram of a surveying instrument main body according to the first embodiment of the present invention.

The surveying instrument main body 3 accommodates a distance measuring module 30, an attitude detector 5, a communication module 6, an arithmetic control module 22, a storage module 23, a display module 34, and an operation module 35 (see FIG. 2). The distance measuring module 30 projects a distance measuring light to an object to be measured or a measurement range (hereinafter referred to as an object to be measured 7), receives a reflected distance measuring light, and performs a distance measurement. Further, the attitude detector 5 enables to detect an attitude of the surveying instrument main body 3 with respect to the vertical (or the horizontal) with high accuracy. Further, the communication module 6 is connected to an external terminal device such a smartphone and a tablet as a remote operation device, or a guiding device such as a crane (to be described later) via a required manner such as a wired or a wireless. By adding the remote operation device via the communication module 6, the surveying instrument main body 3 is configured to be capable of being remotely operated. Further, data can be transmitted and received among the surveying instrument main body 3, the remote operation device, and the guiding device via the communication module 6.

As shown in FIG. 1, the installation base unit 4 has a frame unit 8 and a base member 9. A left-and-right rotation shaft 11 is protruded from a lower surface of the frame unit 8, and the left-and-right rotation shaft 11 is rotatably fitted to the base member 9 via a bearing (not shown). The frame unit 8 is rotatable around the left-and-right rotation shaft 11 in the left-and-right direction.

Further, a left-and-right angle detector 12 (an encoder, for example) which detects a left-and-right angle (an angle in a rotating direction around the left-and-right rotation shaft 11) is provided between the left-and-right rotation shaft 11 and the base member 9. A relative rotation angle of the frame unit 8 in the left-and-right direction with respect to the base member 9 is detected by the left-and-right angle detector 12.

A left-and-right rotation gear 13 is fixed to the base member 9 concentrically with the left-and-right rotation shaft 11, and a left-and-right pinion gear 14 is meshed with the left-and-right rotation gear 13. A left-and-right motor 15 as a left-and-right rotary driving module is provided on the frame unit 8, and the left-and-right pinion gear 14 is fixed to an output shaft of the left-and-right motor 15.

The left-and-right pinion gear 14 is rotated by driving the left-and-right motor 15, and the left-and-right pinion gear 14 revolves around the left-and-right rotation gear 13. Further, the frame unit 8 and the surveying instrument main body 3 are integrally rotated. Thus, the surveying instrument main body 3 is rotated by the left-and-right motor 15 in the left-and-right direction.

The frame unit 8 has a recess shape having a recess portion, and the surveying instrument main body accommodated in the recess portion. The surveying instrument main body 3 is supported by the frame unit 8 via an up-and-down rotation shaft 16, and the surveying instrument main body 3 is rotatable around the up-and-down rotation shaft 16 in the up-and-down direction.

An up-and-down rotation gear 17 is fitted and fixed to one end of the up-and-down rotation shaft 16. An up-and-down pinion gear 18 is meshed with the up-and-down rotation gear 17. The up-and-down pinion gear 18 is fixed to an output shaft of an up-and-down motor 19, as an up-and-down rotary driving module, provided on the frame unit 8. When the up-and-down motor 19 is driven, the up-and-down pinion gear 18 is rotated, and further, the surveying instrument main body 3 is rotated via the up-and-down rotation gear 17 up-and-down rotation shaft 16. Thus, the surveying instrument main body 3 is rotated in the up-and-down direction by the up-and-down motor 19.

Further, an up-and-down angle detector 21 (an encoder, for example) which detects an up-and-down angle (an angle in a rotating direction around the up-and-down rotation shaft 16) is provided on one end of the up-and-down rotation shaft 16. A relative rotation angle of the surveying instrument main body 3 in the up-and-down direction with respect to the frame unit 8 is detected by the up-and-down angle detector 21.

By a cooperation of the left-and-right motor 15 and the up-and-down motor 19, the surveying instrument main body 3 can be directed toward a desired direction. It is to be noted that, the frame unit 8 and the base member 9 make up a supporting potion of the surveying instrument main body 3. Further, the left-and-right motor 15 and the up-and-down motor 19 make up a rotary driving module of the surveying instrument main body 3. Further, the left-and-right angle detector 12 and the up-and-down angle detector 21 make up an angle detector which detects the left-and-right angle and the up-and-right angle of the surveying instrument main body 3.

Drivings of the left-and-right motor 15 and the up-and-down motor 19 are controlled by the arithmetic control module 22 of the surveying instrument main body 3. The left-and-right angle and the up-and-down angle detected by the left-and-right angle detector 12 and the up-and-down angle detector 21 are inputted to the arithmetic control module 22. Data acquired by the surveying instrument main body 3, that is, data of the left-and-right angle and the up-and-down angle, distance measurement data (to be described later), image data (to be described later), parameter data (to be described later), and the like are stored in the storage module 23. Further, various types of data acquired by the surveying instrument main body 3 are transmitted to a terminal device, a PC, and the like via the communication module 6.

It is to be noted that, in a case where a measurement area by the surveying instrument 1 is within a range of a deflection angle by an optical axis deflector 24 (to be described later), or in a case where a directional initial setting of a reference optical axis "O" of the optical axis deflector 24 is performed manually, the left-and-right motor 15, the left-and-right angle detector 12, the up-and-down motor 19, the up-and-down angle detector 21, and the like can be omitted.

Next, a concrete description will be given on the surveying instrument main body 3 by referring to FIG. 3.

The surveying instrument main body 3 includes a distance measuring light projecting module 25, a light receiving module 26, a distance measurement calculating module 27, an image pickup module 28, a projecting direction detecting module 29, a motor driver 31, the attitude detector 5, the communication module 6, the arithmetic control module 22, the storage module 23, an image pickup control module 32, an image processing module 33, the display module 34, the operation module 35, and the like. These components are accommodated in a casing 36 and integrated. It is to be noted that, the distance measuring light projecting module 25, the light receiving module 26, the distance measurement calculating module 27, and the like make up the distance measuring module 30. The distance measuring module 30 functions as an electronic distance meter.

The distance measuring light projecting module 25 has a projection optical axis 37, and a light emitter 38, for instance, a laser diode (LD), is provided on the projection optical axis 37. Further, a projecting lens 39 is provided on the projection optical axis 37. Further, the projection optical axis 37 is deflected by a first reflection mirror 41 provided on the projection optical axis 37 as a deflecting optical component and by a second reflection mirror 43 provided on a light receiving optical axis 42 (to be described later) as a defecting optical component to coincide with the light receiving optical axis 42. The first reflection mirror 41 and the second reflection mirror 43 make up a projection optical axis deflector.

The light emitter 38 emits a pulsed laser beam. The distance measuring light projecting module 25 emits the pulsed laser beam emitted from the light emitter 38 as a distance measuring light 44.

A description will be given on the light receiving module 26. A reflected distance measuring light 45 from the object to be measured enters the light receiving module 26. The light receiving module 26 has the light receiving optical axis 12, and the light receiving optical axis 42 coincides with the projection optical axis 37 deflected by the first reflection mirror 41 and the second reflection mirror 43. It is to be noted that an axis of a state where the projection optical axis 37 coincides with the light receiving optical axis 12 is a distance measuring optical axis 46 (to be described later).

The optical axis deflector 24 is disposed on the deflected projection optical axis 37, that is, on the light receiving optical axis 42. A straight optical axis transmitted through a center of the optical axis deflector 24 is the reference optical axis "O". The reference optical axis "O" coincides with the projection optical axis 37, the light receiving optical axis 42 and the distance measuring optical axis 46 when they are not deflected by the optical axis deflector 24.

The reflected distance measuring light 45 is transmitted through the optical axis deflector 24, and a focusing lens 47 is disposed on the incident light receiving optical axis 42. Further, a photodetector 48 such as an avalanche photodiode (APD) or a photodiode (PD) is provided on the light receiving optical axis 42. The focusing lens 47 focuses the reflected distance measuring light 45 on the photodetector 48. The photodetector 48 receives the reflected distance measuring light 45 and generates a light receiving signal. The light receiving signal is inputted to the distance measurement calculating module 27, and the distance measurement calculating module 27 performs a distance measurement to the object to be measured based on the light receiving signal.

As the storage module 23, a magnetic storage device such as an HDD and an FD, an optical storage device such as a CD, a DVD and an MO, and a semiconductor memory such as a memory card is used. In the storage module 23, various types of programs are stored. These programs include an image pickup control program, an image processing program, a display program, a communication program, an operation command creating program, a tilt angle calculation program for calculating a tilt angle and a tilting direction of the surveying instrument main body 3 based on an attitude detection result from the attitude detector 5, a measurement program for carrying out the distance measurement, a deflection control program for controlling a deflecting operation of the optical axis deflector 24, a tracking program for tracking the object to be measured 7, a parameter calculation program for calculating parameters such as a position, an attitude and a direction of the object to be measured 7 based on the measurement result, a detection program for detecting the object to be measured 7 or for detecting a corner part of the object to be measured 7 based on a picked-up image, a calculation program for calculating ridge lines and the corner part of the object to be measured. 7, a guiding program for calculating a guiding information based on a comparison of the measurement result and design drawing data, a calculation program for executing various types of calculations, and other programs. Further, various types of data such as distance measurement data, angle measurement data, and design drawing data are stored in the storage module 23.

The arithmetic control module 22 develops and executes the various types of programs according to an operating state of the surveying instrument main body 3, performs a control of the distance measuring light projecting module 25, a control of the distance measurement calculating module 27, a control of the image pickup module 28, and the like, by the surveying instrument main body 3 and carries out the distance measurement. It is to be noted that, as the arithmetic control module 22, a CPU specialized for this instrument or a general-purpose CPU is used.

Figure 4:
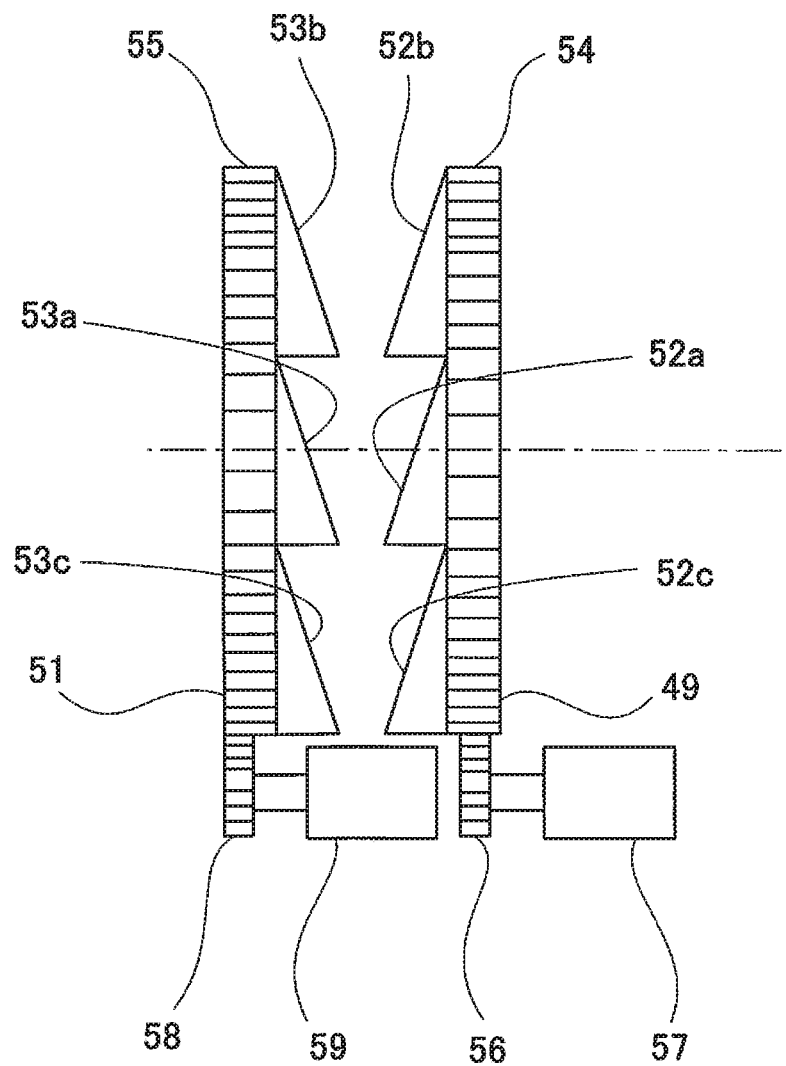
FIG. 4 is a schematical diagram of an optical axis deflector in the surveying instrument main body.

A description will be given on the optical axis deflector 24 by referring FIG. 4.

The optical axis deflector 24 is configured by a pair of optical prisms 49 and 51. Each of the optical prisms 49 and 59 has a disk shape with the same diameter, is disposed concentrically each other and crossing the light receiving optical axis 42 at a right angle on the light receiving optical axis 42, and is arranged in parallel at a predetermined interval. The optical prism 49 is formed from three triangular prisms 52*a*, 52*b* and 52*c* which are formed from optical glass and arranged in parallel. The optical prism 51 is formed from three triangular prisms 53*a*, 53*b* and 53*c* which are formed from optical glass and arranged in parallel. It is to be noted that the triangular prisms 52*a*, 52*b* and 52*c* and the triangular prisms 53*a*, 53*b* and 53*c* have optical characteristics of the same deflection angle.

A width and a shape of each of the triangular prisms may be the same or may be different. The widths of the triangular prisms 52*a* and 53*a* positioned at the center are larger than a beam diameter of the distance measuring light 44. Therefore, the distance measuring light 44 is adapted to transmit only the triangular prisms 52*a* and 53*a*. It is to be noted that the triangular prisms positioned other than the center may be constituted by a plurality of small triangular prisms.

Further, the triangular prisms 52*a* and 53*a* at the center may be made of optical glass, and the triangular prisms 52*b* and 52*c* and the triangular prisms 53*b* and 53*c* other than the center may be made of optical plastic. That is because a distance from the optical axis deflector 24 to the object to be measured 7 is large, optical characteristics of the triangular prisms 52*a* and 53*b* require an accuracy. On the other hand, a distance from the triangular prisms 52*b* and 52*c* and the triangular prisms 53*b* and 53*c* to the photodetector 48 is small, and highly accurate optical characteristics are not required.

A central part of the optical axis deflector 24 (a central part of the triangular prisms 52*a* and 53*a*) is a distance measuring light deflector (a first optical axis deflector) through which the distance measuring light 44 is transmitted and is projected. A portion excluding the central part of the optical axis deflector 24 (both end portions of the triangular prisms 52*a* and 53*a*, the triangular prisms 52*b* and 52*c* and the triangular prisms 53*b* and 53*c*) is a reflected distance measuring light deflector (a second optical axis deflector) through which the reflected distance measuring light 45 enters and is transmitted.

The optical prisms 49 and 51 are arranged rotatably individually and independently around the light receiving optical axis 42. The optical prisms 49 and 51 are controlled by the arithmetic control module 22 regarding a rotating direction, a rotation amount and a rotating speed. Thereby, the optical prisms 49 and 51 deflect the projection optical axis 37 of the projected distance measuring light 44 in an arbitrary direction and also deflect the light receiving optical axis 42 of the received reflected distance measuring light 45 in parallel with the projection optical axis 37.

Outer shapes of the optical prisms 49 and 51 are circular around the light receiving optical axis 42 (the reference optical axis "O"), respectively. Further, diameters of the optical prisms 49 and 51 are set in such a manner that a sufficient light amount can be obtained by considering a spread of the reflected distance measuring light 45.

A ring gear 54 is fitted on an outer periphery of the optical prism 49. A ring gear 55 is fitted on an outer periphery of the optical prism 51.

A driving gear 56 is meshed with the ring gear 54. The driving gear 56 is fixed to an output shaft of a motor 57. Similarly, a driving gear 58 is meshed with the ring gear 55. The driving gear 58 is fixed to an output shaft of a motor 59. The motors 57 and 59 are electrically connected to the motor driver 31.

As the motors 57 and 59, motors which are capable of detecting the rotation angle are used, or motors which rotate corresponding to a driving input value such as a pulse motor, for instance, are used. Alternatively, a rotation angle detector for detecting rotation amounts (rotation angles) of the motors such as an encoder, for instance, may be used, and the rotation amounts of the motors 57 and 59 may be detected by the rotation angle detector. The rotation amounts of the motors 57 and 59 are detected, respectively, and the motors 57 and 59 are individually controlled by the motor driver 31. It is to be noted that an encoder may be attached directly to the ring gears 54 and 55, respectively. In this case, the rotation angles of the ring gears 54 and 55 are directly detected by the encoders.

Here, since a deflection angle of the optical axis deflector 24 is small with respect to the rotation angles of the optical prisms 49 and 51 (for instance, a rotation angle to obtain a deflection angle ±10° is ±4°), the deflection angle of the optical axis deflector 24 can be changed with high accuracy.

The driving gears 56 and 58 and the motors 57 and 59 are provided at positions not interfering with the distance measuring light projecting module 25 such as at lower positions of the ring gears 54 and 55, for instance.

The projecting lens 39, the first reflection mirror 41, the second reflection mirror 43, the distance measuring light deflector and the like make up a projection optical system. Further, the reflected distance measuring light deflector, the focusing lens 47 and the like make up a light receiving optical system.

As the distance measurement calculating module 27, a CPU specialized for this instrument or a general-purpose CPU is used. The distance measurement calculating module 27 controls the light emitter 38 and makes the light emitter 38 pulse-emit or burst-emit (intermittently emit) the laser beam as the distance measuring light 44. The projection optical axis 37 is deflected by the triangular prisms 52a and 53a (the distance measuring light deflector) in such a manner that the distance measuring light 44 is directed toward the object to be measured 7. The distance measurement is performed in a state where the distance measuring optical axis 46 sights the object to be measured 7. It is to be noted that a part of the functions of the arithmetic control module 22 may be assigned to the distance measurement calculating module 27.

The reflected distance measuring light 45 reflected from the object to be measured 7 enters through a part of the triangular prisms 52a, the triangular prisms 52b and 52c, a part of the triangular prisms 53a, the triangular prisms 53b and 53c (the reflected distance measuring light deflector), and the focusing lens 47 and is received on the photodetector 48. The photodetector 48 transmits the light receiving signal to the distance measurement calculating module 27. The distance measurement calculating module 27 performs the distance measurement of a measuring point (point irradiated with the distance measuring light) for each pulsed light based on the light receiving signal from the photodetector 48. The distance measurement data is stored in the storage module 23.

The projecting direction detecting module 29 counts driving pulses inputted to the motors 57 and 59 and detects the rotation angles of the motors 57 and 59. Alternatively, the projecting direction detecting module 29 detects the rotation angles of the motors 57 and 59 based on a signal from the encoders. Further, the projecting direction detecting module 29 calculates rotational positions of the optical prisms 49 and 51 based on the rotation angles of the motors 57 and 59. Further, the projecting direction detecting module 29 calculates a deflection angle and a projecting direction of the distance measuring light 44 for each pulsed light based on refractive indexes the rotational positions of the optical prisms 49 and 51. A calculation result (an angle measurement result) is associated with the distance measurement result and is inputted to the arithmetic control module 22. It is to be noted that in a case where the distance measuring light 44 is burst-emitted, the distance measurement is performed for each intermittent distance measuring light.

By controlling the rotating directions and the rotating speeds of the motors 57 and 59 and a rotation ratio between the motors 57 and 59, the arithmetic control module 22 controls a deflecting action by the optical axis deflector 24. Further, the arithmetic control module 22 calculates a horizontal angle and a vertical angle of the measuring point with respect to the reference optical axis "O" from the deflection angle and the projecting direction of the distance measuring light 44. Further, the arithmetic control module 28 associates the horizontal angle and the vertical angle regarding the measuring point with the distance measurement data and can acquire three-dimensional data of the object to be measured 7. Thus, the surveying instrument 1 functions as a total station.

Next, a description will be given on the attitude detector 5. It is to be noted that as the attitude detector 5, an attitude detector disclosed in Japanese Patent Application Publication No. 2016-151423 can be used.

The attitude detector 5 will be described in brief. The attitude detector 5 has a frame 61. The frame 61 is fixed to the casing 36 or fixed to a structural component and is integrated with the surveying instrument main body 3.

A sensor block 62 is mounted on the frame 61 via a gimbal. The sensor block 62 is rotatable by 360° in two directions around two axes crossing each other at a right angle.

A first tilt sensor 63 and a second tilt sensor 64 are mounted on the sensor block 62. The first tilt sensor 63 is a sensor which detects the horizontal with high accuracy, for instance, a tilt detector which makes a detection light enter a horizontal liquid surface and detects the horizontal according to a change of a reflection angle of a reflected light. Alternatively, the first tilt sensor 63 is an air bubble tube which detects the tilt according to a positional change of sealed air bubbles. Further, the second tilt sensor 64 is a sensor which detects a tilt change with high responsiveness, for instance, an acceleration sensor.

Each relative rotation angle of the two axes of the sensor block 62 with respect to the frame 61 is adapted to be detected by encoders 65 and 66.

Further, motors (not shown) which rotate the sensor block 62 in order to maintain the sensor block 62 horizontally are provided in relation with the two axes, respectively. The motors are controlled by the arithmetic control module 22 in such a manner that the sensor block 62 is maintained horizontally based on detection results from the first tilt sensor 63 and the second tilt sensor 64.

In a case where the sensor block 62 is tilted (in a case where the surveying instrument main body 3 tilted), the relative rotation angle of the frame 61 with respect to the sensor block 62 (horizontal) is detected by the encoders 65 and 66. Based on the detection results of the encoders 65 and 66, the tilt angles and the tilting direction of the surveying instrument main body 3 are detected.

The sensor block 62 is rotatable by 360° with respect to the two axes and hence, whatever the attitude detector 5 takes any attitude or even if the attitude detector 5 is inverted upside down, for instance, the attitude detector 5 is capable of an attitude detection in all the directions.

In the attitude detection, in a case where high responsiveness is required, an attitude detection and an attitude control are performed based on the detection result of the second tilt sensor 64. However, the second tilt sensor 64 has a detection accuracy poorer than the first tilt sensor 63 in general.

The attitude detector includes the first tilt sensor 63 with high accuracy and the second tilt sensor 64 with high responsiveness. Thereby, it is possible to perform the attitude control based on the detection result of the second tilt sensor 64 and further, to perform the attitude detection with high accuracy by the first tilt sensor 63.

The detection result of the second tilt sensor 64 can be calibrated based on the detection result of the first tilt sensor 63. When a deviation is occurred between values of the encoders 65 and 66 of when the first tilt sensor 63 detects the horizontal, that is, between an actual tilt angle and a tilt angle detected by the second tilt sensor 64, the tilt angle of the second tilt sensor 64 can be calibrated based on the deviation.

Therefore, the relationship between a detected tilt angle of the second tilt sensor 64 and a tilt angle, which is obtained based on the horizontal detection by the first tilt sensor 63 and the detection results of the encoders 65 and 66, is obtained in advance, the arithmetic control module 22 can calibrate the tilt angle detected by the second tilt sensor 64, and an accuracy of the attitude detection with high responsiveness by the second tilt sensor 64 can be improved.

The arithmetic control module 22 controls the motors based on a signal from the second tilt sensor 64 when a tilt fluctuation is large and when a tilt change is rapid. Further, the arithmetic control module 22 controls the motors based on a signal from the first tilt sensor 63 when the tilt fluctuation is small and when the tilt change is mild, that is, in a state where the first tilt sensor 63 is capable of following up.

In the storage module 23, comparison data indicating a comparison result between the detection result of the first, tilt sensor 63 and the detection result of the second tilt sensor 64 is stored. The detection result by the second tilt sensor 64 is calibrated based on the signal from the first tilt sensor 63. By this calibration, the detection result by the second tilt, sensor 64 can be improved to the detection accuracy of the first tilt sensor 63. Thus, in the attitude detection by the attitude detector 5, high responsiveness can be realized while high accuracy is maintained.

The image pickup module 28 has an image pickup optical axis 67 in parallel to the reference optical axis "O" of the surveying instrument main body 3, an image pickup lens 68 arranged on the image pickup optical axis 67, and an image pickup element 69 arranged on the image pickup optical axis 67. The image pickup module 28 is a camera having a field angle approximately equal to a field angle of a maximum deflection angle θ/2 (±30°, for instance) of the optical prisms 49 and 51, or a filed angle larger than the maximum deflection angle. For instance, the image pickup module 28 has a field angle 50° to 60' and acquires image data including a scan area (an area which can be scanned) of the surveying instrument main body 3. The relationship among the image pickup optical axis 67, the projection optical axis 37 and the reference optical axis "O" is already-known. That is, the image pick up optical axis 67, the projection optical axis 37 and the reference optical axis "O" are parallel with each other, and the distance between each of the optical axes has a known value.

Further, the image pickup module 28 can acquire a still image, a continuous image or a video image in real time. A center of the image acquired by the image pickup module 28 coincides with the image pickup optical axis 67. Therefore, the reference optical axis "O" is positioned deviated by a predetermined field angle with respect to the center of the image based on the known relationship between the reference optical axis "O" and the image pickup optical axis 67.

The image pickup control module 32 controls an image pickup of the image pickup module 28. In a case where the image pickup module 28 picks up the video image or the continuous image, the image pickup control module 32 synchronizes a timing of acquiring a frame image constituting the video image or the continuous image with a timing of scanning by the surveying instrument main body 3. The arithmetic control module 22 also performs associating the image with the measurement data (the distance measurement data, the angle measurement data).

The image pickup element 69 is a CCD or a CMOS sensor which is an aggregate of pixels and each pixel can specify a position on an image element. Each pixel has pixel coordinates in a coordinate system with the image pickup optical axis 67 as an origin, for instance, and a position on the image element is specified by the pixel coordinates. Further, since the relationship (distance) between the image pickup optical axis 67 and the reference optical axis "O" is already-known, a mutual association between the measuring position by the distance measuring module and the position on the image pickup element 69 can be made. An image signal outputted from the image pickup element 69 is inputted to the image processing module 33 via the image pickup control module 32.

The image processing module 33 performs an image processing such an edge extraction regarding the image data acquired by the image pickup module 28 and extracts ridge lines and a central line of the object to be measured 7.

The display module 34 displays the image acquired by the image pickup module 28, parameters of the object to be measured 7 and the like. Further, the operation module 35 inputs a setting of a measuring condition, a selection of the object to be measured 7 and the like. It is to be noted that the display module 34 may be a touch panel. In this case, since the display module 34 also serves as an operation module, the operation module 35 can be omitted. Further, the display module 34 and the operation module 35 may be unitized, and the unit may be attachable and detachable with respect to the surveying instrument main body 3. In this case, a communication module is additionally provided on the unit. Further, a terminal device such as a smartphone or a tablet may be used as the display module 34 and the operation module 35. In this case, the terminal device functions as a remote operation device, and the surveying instrument main body 3 can be remotely controlled via the communication module 6.

A description will be given on a deflecting action and a scanning action of the optical axis deflector 24 by referring to FIG. 5A, FIG. 5B and FIG. 5C.

Figure 5A:
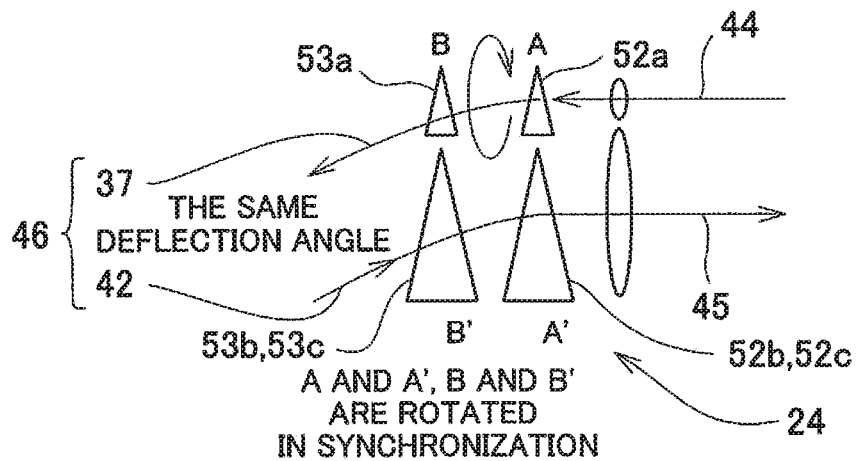
FIG. 5A, FIG. 5B, and FIG. 5C are drawings to explain an action of the optical axis deflector.

It is to be noted that, in order to simplify an explanation, in FIG. 5A, the optical prisms 49 and 51 are shown by separating the triangular prisms 52a and 53a and the triangular prisms 52b, 52c, 53b and 53c. Further, FIG. 5A shows a state where the triangular prisms 52a and 53a and the triangular prisms 52b, 52c, 53b and 53c are positioned in the same direction, and the maximum deflection angle (for instance, ±30°) is obtained in this state. Further, in a state where either one of the optical prisms 49 and 51 is at a position in which either one of the optical prisms 49 and 51 is rotated by 180° with respect to the other optical prism, mutual optical actions of the optical prisms 49 and 51 are offset, and the minimum deflection angle (0°) is obtained. Therefore, the optical axis (the distance measuring optical axis 46) of the pulsed laser beam, as emitted and received through the optical prisms 49 and 51, coincides with the reference optical axis "O".

The distance measuring light 44 is emitted from the light emitter 38, and the distance measuring light 44 is turned to a parallel luminous flux by the projecting lens 39 and is emitted toward the object to be measured 7 through the distance measuring light deflector (the triangular prisms 52a and 53a). Here, by passing through the distance measuring light deflector, the distance measuring light 44 is deflected by the triangular prisms 52a and 53a in a required direction and is emitted (FIG. 5A).

The reflected distance measuring light 45 reflected by the object to be measured 7 is entered through the reflected distance measuring light deflector and is focused on the photodetector 48 by the focusing lens 47.

When the reflected distance measuring light 45 passes through the reflected distance measuring light deflector, an optical axis of the reflected distance measuring light 45 is deflected by the triangular prisms 52b and 52c and the triangular prisms 53b and 53c to coincide with the light receiving optional axis 42 (FIG. 5A).

By combining the rotational position of the optical prism 49 with the rotational position of the optical prism 51, a deflecting direction and a deflection angle of the distance measuring light 44 to be emitted can be arbitrarily changed.

Further, when the optical prism 49 and the optical prism 51 are integrally rotated by the motors 57 and 59 in a condition where the positional relationship between the optical prism 49 and the optical prism 51 is fixed (that is, in a condition where the deflection angle obtained by the optical prism 49 and the optical prism 51 is fixed), a locus drawn by the distance measuring light 44 passing through the distance measuring light deflector becomes a circle around the reference optical axis "O".

Therefore, when the optical axis deflector 24 is rotated while emitting the laser beam from the light emitter 38, the distance measuring light 44 can be scanned by the circular locus. It is to be noted that it is needless to say that the reflected distance measuring light deflector rotates integrally with the distance measuring light deflector.

Figure 5B:
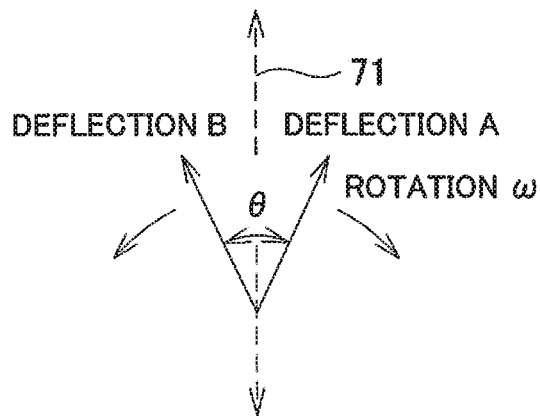

FIG. 5B shows a case where the optical prism 49 and the optical prism 51 are relatively rotated. Assuming that a deflecting direction of the optical axis deflected by the optical prism. 49 is a deflection "A" and a deflecting direction of the optical axis deflected by the optical prism 51 is a deflection "B", a deflection of the optical axes by the optical prisms 49 and 51 becomes a synthetic deflection "C" with an angle difference "θ" between the optical prisms 49 and 51.

Therefore, by rotating the optical prism 49 and the optical prism 51 in the opposite directions at the equal speed, the distance measuring light 44 can be round-trip-scanned in a direction of the synthetic deflection "C" by a straight line 71.

Figure 5C:
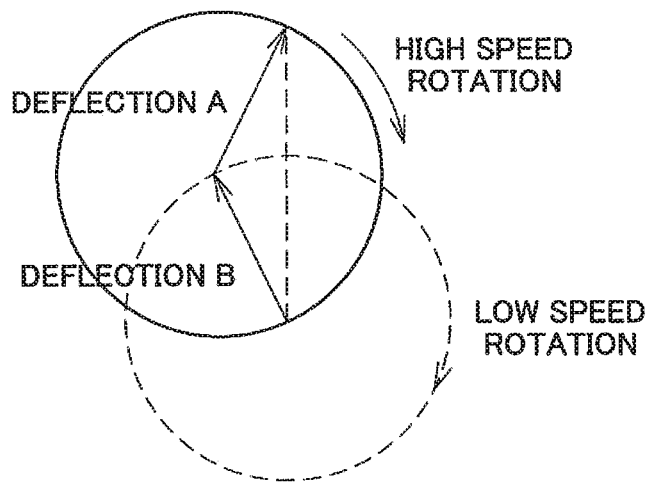

Further, as shown in FIG. 5C, when the optical prism 51 is rotated at a rotating speed lower than a rotating speed of the optical prism 49, the distance measuring light 44 is rotated while the angle difference "θ" gradually increases. Therefore, the scan locus of the distance measuring light 44 becomes a spiral form.

Further, by individually controlling the rotating directions and the rotating speeds of the optical prism 49 and the optical prism 51, the scan locus of the distance measuring light 44 can be made to various scan patterns around the reference optical axis "O".

By referring to FIG. 6A, FIG. 6B, FIG. 6C and FIG. 6D, a description will be given on an acquisition of the parameters of the object to be measured 7 using the surveying instrument 1. It is to be noted that, in the following description, a case where the object to be measured 7 is a pillar having a rectangular cross section will be described.

Figure 6A:
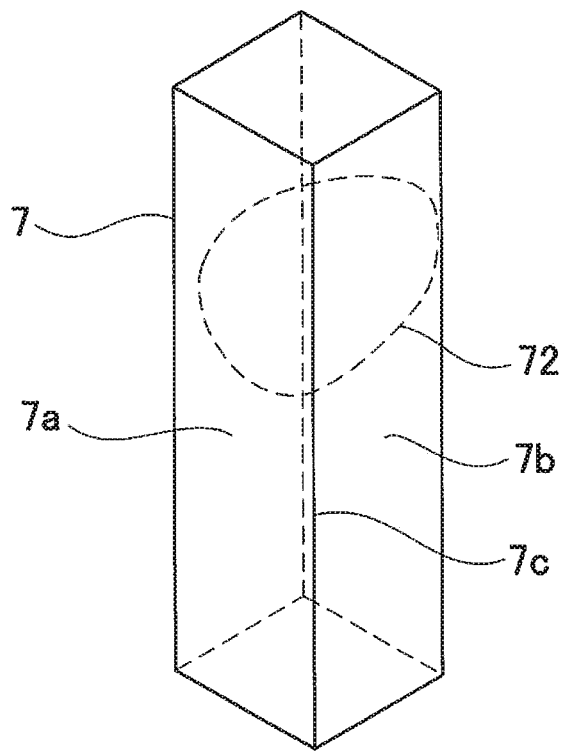
FIG. 6A, FIG. 6B, FIG. 6C, and FIG. 6D are explanatory drawings to show a method for calculating a plane according to the first embodiment of the present invention.

In case of calculating the parameters of the object to be measured 7, a scan pattern of the distance measuring light 44 is firstly set through the operation module 35. Next, the reference optical axis "O" is directed toward the object to be measured 7 in such a manner that a locus of the scan pattern includes at least one plane in the object to be measured 7. FIG. 6A shows a case where a circular scan pattern 72 is used and the distance measuring light 44 is scanned in such a manner that the scan pattern 72 reaches two planes 7a and 7b of the object to be measured 7. When the distance measuring light 44 is scanned, point cloud data along a locus of the scan pattern 72 is acquired.

Figure 6B:
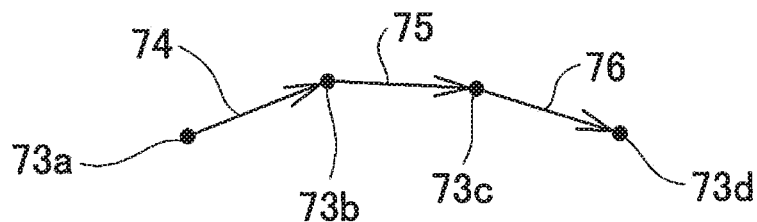

The point cloud data is an aggregate of measuring points 73 measured along the locus of the scan pattern 72 at each predetermined angle pitch. FIG. 6B shows four continuous measuring points 73a, 73b, 73c and 73d extracted from the point cloud data, a vector 74 connecting the measuring point 73a with the measuring point 73ba vector 75 connecting the measuring point 73b with the measuring point 73c and a vector 76 connecting the measuring point 73c with the measuring point 73d. In the present embodiment, based on measurement results of the continuous three measuring points, a normal vector can be calculated.

Figure 6C:
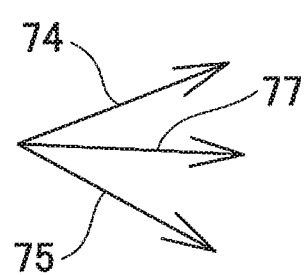

As shown in FIG. 6C, by calculating a cross product of the vector 74 and the vector 75, a normal vector 77 can be obtained. The normal vector 77 is a vector which is orthogonal to a plane on which the three measuring points 73a, 73b and 73c exist. Therefore, based on the normal vector 77, the plane on which the measuring points 73a, 73b and 73c exist is calculated. Further, since this plane constitutes the object to be measured 7, an inclination, an inclining direction and the like of the object to be measured 7 can be calculated based on a calculation result of the plane. Here, a state of the plane, an inclination and an inclining direction indicating an attitude, a distance or a direction with respect to the surveying instrument main body 3 and others are defined as parameters.

Figure 6D:
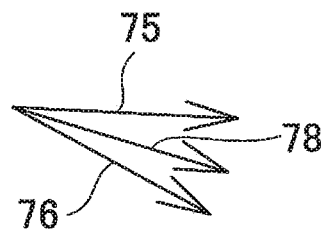

Similarly, as shown in FIG. 6D, by calculating the cross product of the vector 75 and the vector 76, a normal vector 78 can be obtained. The normal vector 78 is a vector which is orthogonal to a plane where the three measuring points 73b, 73c and 73d exist. Therefore, based on the normal vector 78, the plane on which the measuring points 73b, 73c and 73d exist can be calculated. Further, based on the calculation result of the plane, parameters of the plane constituting the object to be measured 7 can be calculated.

Here, in a case where the normal vector 77 and the normal vector 78 are parallel to each other, that is, in a case where the plane on which the measuring points 73a, 73b and 73c exist coincides with the plane on which the measuring points 73b, 73c and 73d exist, the plane on which the measuring points 73a, 73b and 73c exist can be determined to be the same as the plane on which the measuring points 73b, 73c and 73d exist.

Further, in a case where the normal vector 77 and the normal vector 78 are not parallel to each other, that is, in a case where the plane on which the measuring points 73a, 73b and 73c exist does not coincide with the plane on which the measuring points 73b, 73c and 73d exist, the plane on which the measuring points 73a, 73b and 73c exist can be determined to be different from the plane on which the measuring points 73b, 73c and 73d exist.

With respect to the remaining measuring points 73 in the point cloud data, the same processing as the processing described above is performed. Thereby, it is possible to calculate the two planes 7a and 7b having many parallel normal vectors and a plane having a normal vector which is not orthogonal to both the planes 7a and 7b.

Here, obtaining the normal vector which is not orthogonal to both the planes 7a and 7b means that one of the three measuring points exists on a different plane. Therefore, it can be considered that an intersecting position (an intersection line) 7c of the two planes 7a and 7b exist among the three measuring points used for a calculation of the normal vector which is not orthogonal to both the two planes 7a and 7b. Alternatively, the image acquired by the image pickup module 28 may be image-processed by the image processing module 33, and an edge of the object to be measured 7 may be detected.

When the two planes 7a and 7b of the object to be measured 7 are calculated, parameters of the two planes 7a and 7b are calculated by the arithmetic control module 22. Further, when the intersection line 7c (an equation of a straight line) is calculated, parameters of the intersection line 7c are calculated by the arithmetic control module 22. Here, the parameters of the intersection line mean, for instance, a position of the intersection line and an inclination and an inclining direction of the intersection line. The calculated parameters of the two planes 7a and 7b and the parameters of the intersection line 7c are displayed on the display module 34.

Figure 7:
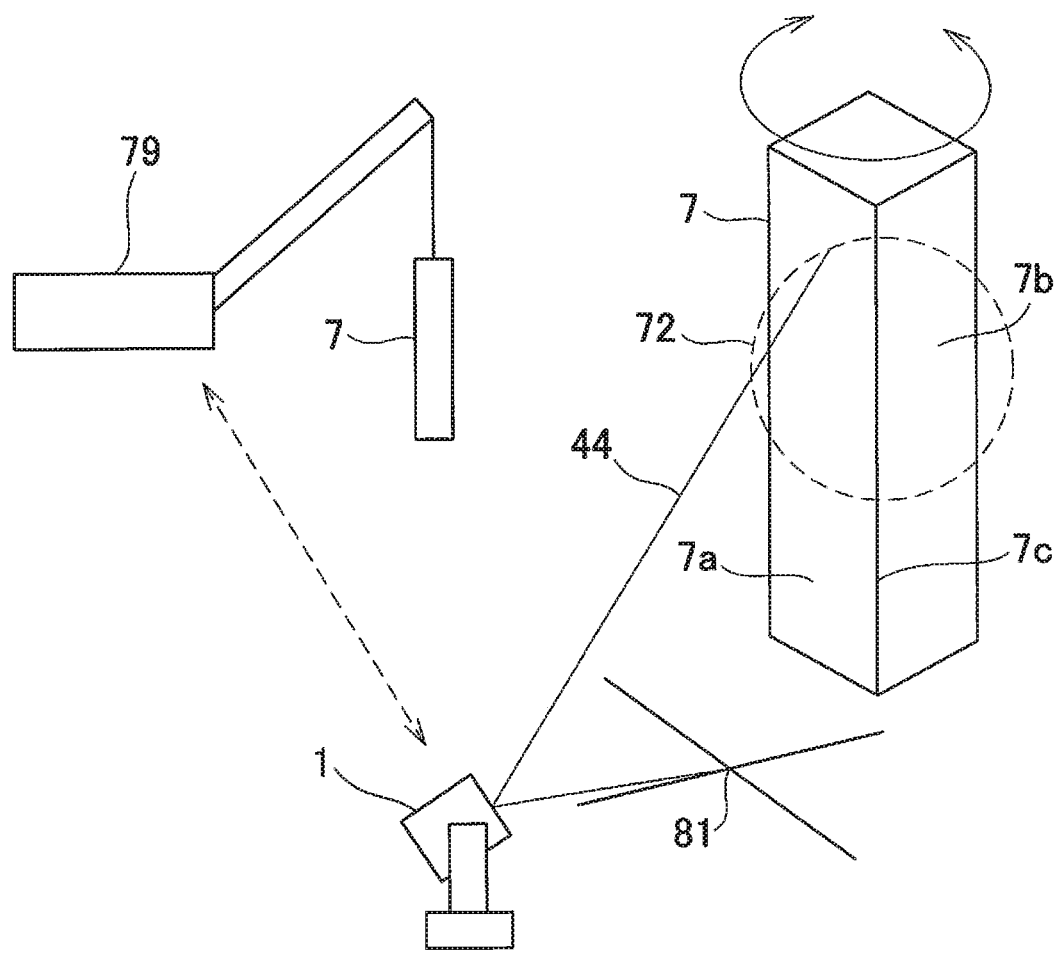
FIG. 7 is an explanatory drawing to show an example of a measurement using the surveying instrument according to the first embodiment of the present invention.
Figure 8:
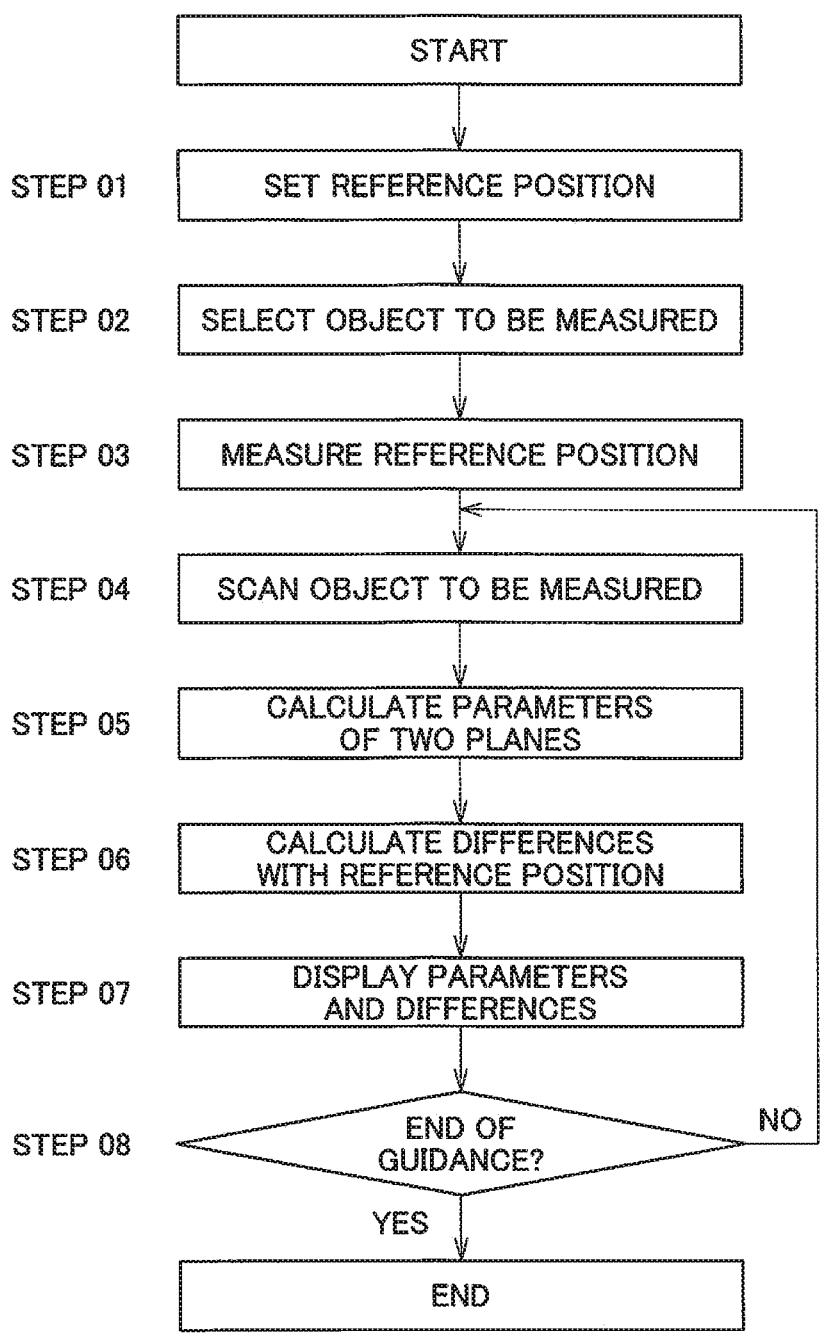
FIG. 8 is a flowchart to explain a guidance processing using the surveying instrument according to the first embodiment of the present invention.

A description will be given on a guidance processing of the object to be measured 7 using the surveying instrument 1 by referring to FIG. 7 and a flowchart of FIG. 8. It is to be noted that FIG. 7 shows an example where the object to be measured (a steel frame) 7 in a rectangular column shape suspended by a crane 79 is guided to a reference position 81.

(Step 01) Firstly, the reference position 81 is set by the operation module 35. The reference position 81 is an installation position of the object to be measured 7. The reference position 81 is set based on the design drawing data stored in the storage module 23, for instance. It is to be noted that it is desirable to position the reference position 81 within the image acquired by the image pickup module 28.

(Step 02) Next, the worker selects the object to be measured. 7 based on the image acquired by the image pickup module 28 and displayed on the display module 34. Alternatively, the arithmetic control module 22 may automatically detect the object to be measured 7 from the image based on a shape of the object to be measured 7 stored in advance.

(Step 03) When the object to be measured 7 is selected, the arithmetic control module 22 makes the surveying instrument 1 installed at an arbitrary position measure the reference position 81. When the reference position 81 measured, the arithmetic control module 22 measures three-dimensional coordinates of the reference position 81 with reference to an installation position of the surveying instrument 1. It is to be noted that, when the surveying instrument 1 is installed at a known position in a coordinate system of the design drawing data, (Step 03) may be omitted.

(Step 04) After the measurement of the object to be measured 7, the arithmetic control module 22 scans the object to be measured 7 in a scan pattern which is a predetermined two-dimensional closed loop. In the present embodiment, as the two-dimensional closed loop scan pattern, the scan pattern 72 a circular shape is used, and the object to be measured 7 is scanned in one cycle in such a manner that the scan pattern 72 reaches the two planes 7a and 7b. By scanning the object to be measured 7, the point cloud data along the locus of the scan pattern 72 is acquired.

Further, the arithmetic control module 22 performs a tracking of the object to be measured 7 in parallel with scanning the object to be measured 7. In order to track the object to be measured 7, the arithmetic control module 22 drives the left-and-right motor 15, the up-and-down motor 19 and the motors 57 and 59 in such a manner that the object to be measured 7 is positioned at a predetermined position in the image, for instance.

(Step 05) When the point cloud data is acquired, the arithmetic control module 22 calculates the two planes 7a and 7b and the intersection line 7c based on the four continuous measuring points 73a, 73b, 73c and 73d as described above. Further, the arithmetic control module 22 calculates the parameters of the two planes 7a and 7b based on the calculated two planes 7a and 7b. Further, the arithmetic control module 22 calculates the parameters of the intersection line 7c based on the calculated intersection line 7c.

(Step 06) After the calculation of the parameters, the arithmetic control module 22 calculates differences between the object to be measured 7 and the reference position 81 based on the calculation results of the parameters of the two planes 7a and 7b and the parameters of the intersection line 7c and the three-dimensional coordinates of the reference position 81. Here, the calculated differences mean differences of horizontal two directions of the two planes 7a and 7b (or the intersection line 7c) with respect to the reference position 81, a tilt angle and a tilting direction of the intersection line 7c (or an axis) with respect to the vertical, and rotation angles of the two planes 7a and 7b (or the intersection line 7c) with respect to the reference position 81.

(Step 07) The calculated differences are displayed on the display module 34 and are transmitted to the crane 79 through the communication module 6. The worker guides the object to be measured 7 to the reference position 81 based on a difference information transmitted to the crane 79. It is to be noted that a central axis of the object to be measured (the steel frame) 7 having a known size may be obtained from the two planes 7a and 7b and the intersection line 7c, and the central axis may be guided to the reference position 81.

(Step 08) The scan of the object to be measured 7 and the calculation of the parameters of the two planes 7a and 7b (or the intersection line 7c) by the arithmetic control module 22 are repeatedly carried out until the differences between the object to be measured 7 and the reference position 81 become 0. When the differences become 0, it is determined that the object to be measured 7 is guided to the reference position 81, and the guidance processing of the object to be measured 7 is terminated.

As described above, in the first embodiment, the object to be measured 7 is scanned in the predetermined scan pattern 72, the parameters of the planes 7a and 7b of the object to be measured 7 are calculated based on the scan result, and the guidance processing of the object to be measured 7 is performed based on the calculated parameters of the planes. Alternatively, the parameters of the intersect on line 7c of the object to be measured 7 are calculated, and the guidance processing of the object to be measured 7 is performed based on the calculated parameters of the intersection line 7c.

Therefore, since point cloud data of an entire circumference does not have to be acquired by the surveying instrument 1, the number of data to be acquired can be greatly reduced, and a calculation amount can be also decreased. Further, when the calculation amount is decreased, the guidance can be performed in real time, and the workability can be improved.

Further, in the first embodiment, the parameters of the planes and the intersection line are displayed instead of a measurement result, the object to be measured 7 is guided based on the parameters, and hence the worker can directly acquire an information as required in real time. Further, since the guidance processing can be performed by one person, the workability can be further improved.

It is to be noted that, in the first embodiment, the object to be measured 7 has the rectangular column shape, but the object to be measured 7 may have a cylindrical shape. In this case, the scan pattern 72 is set in such a manner that both ends of the object to be measured 7 in a radial direction are included within the locus, and both ends in the radial direction are detected based on the point cloud data. Further, the central axis of the object to be measured 7 is detected based on both detected ends in the radial direction, and the object to be measured 7 can be guided based on a tilt angle and a tilting direction of the central axis with respect to the vertical and differences of the horizontal two directions between the central axis and the reference position 81. Alternatively, a cylinder having a known radius may be matched based on all point cloud data acquired from the cylindrical object to be measured 7, and the central axis of the object to be measured 7 may be obtained based on a matching result.

Further, in the first embodiment, the two planes 7a and 7b and the intersection line 7c are calculated based on the four continuous measuring points 73a, 73b, 73c and 73d, and the parameters of the two planes 7a and 7b and the intersection line 7c are calculated based on the calculation results. On the other hand, the two planes 7a and 7b may be calculated by plane-fitting based on the three-dimensional coordinates of the point cloud data along the locus of the scan pattern 72. In this case, an intersecting position of the two planes 7a and 7b performed to be plane-fitted is an intersection line 7c.

Further, in the first embodiment, the distance measuring light 44 is scanned in such a manner that the distance measuring light 44 can reach the two planes 7a and 7b. On the other hand, in a case where it would suffice if only a tilt or a direction of a plane is calculated, only one plane may be measured.

Further, in the first embodiment, the circular scan pattern is exemplified as the scan pattern 72 but, it is needless to say that various kinds of two-dimensional closed loop scan patterns such as a shape in a numeral 8 and a trochoidal shape can be applied.

Figure 9:
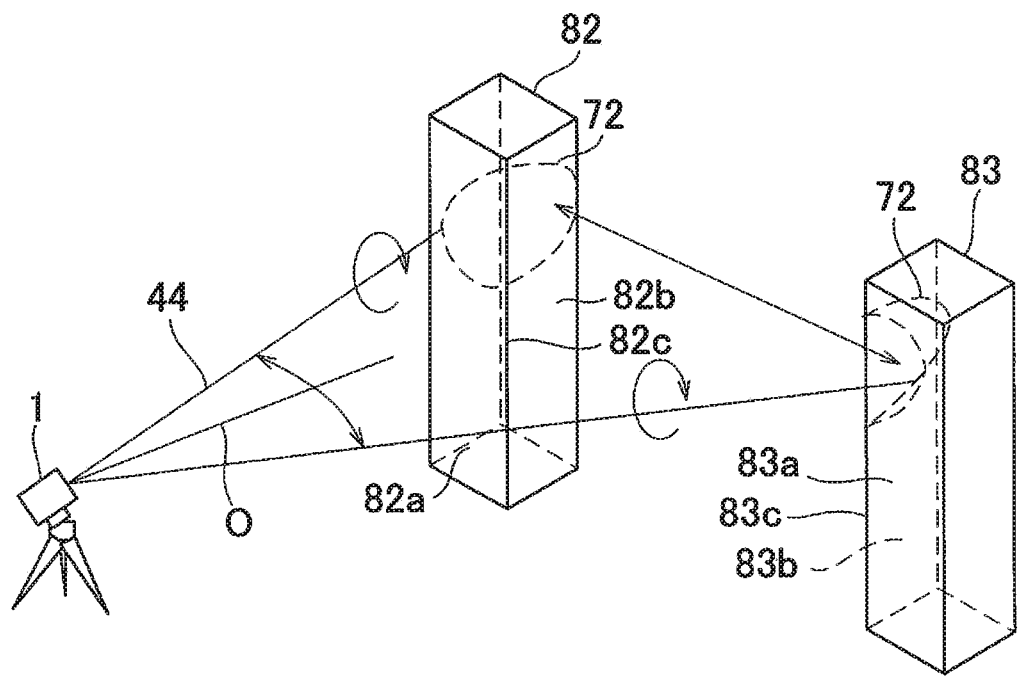
FIG. 9 is an explanatory drawing to show an example of a measurement using a surveying instrument according to a second embodiment of the present invention.

Next, a description will be given on a second embodiment of the present invention by referring to FIG. 9, FIG. 10 and a flowchart of FIG. 11. It is to be noted that, in FIG. 9, the components equivalent to the components in FIG. 7 are referred by the same symbols, and a description thereof will be omitted.

In the second embodiment, one of a first object to be measured 82 and a second object to be measured 83 both of which have a rectangular column shape is guide-processed to the other, and an adjustment is performed in such a manner that the first object to be measured 82 and the second object to be measured 83 have a predetermined positional relationship.

(Step 11) In a state where a surveying instrument 1 is held in an arbitrary attitude, the worker selects the first object to be measured 82 and the second object to be measured 83 based on an image acquired by an image pickup module 28. Alternatively, based on shapes of the first object to be measured 82 and the second object to be measured 83 stored in advance, an arithmetic control module 22 may automatically detect the first object to be measured 82 and the second object to be measured 83 from the image.

(Step 12) Next, the arithmetic control module 22 scans the first object to be measured 82 in a predetermined scan pattern 72. In FIG. 9, the circular scan pattern 72 is used, the first object to be measured 82 is scanned in one cycle in such a manner that the circular patter 72 reaches two planes 82a and 82b of the first object to be measured 82. When the first object to be measured 82 is scanned, point cloud data is acquired along a locus of the scan pattern 72.

(Step 13) When the point cloud data is acquired, the arithmetic control module 22 calculates the two planes 82a and 82b and an intersection line 82c based on four continuous measuring points 73a, 73b, 73c and 73d. Further, based on the calculated two planes 82a and 82b and intersection line 82c, the arithmetic control module 22 calculates parameters of the two planes 82a and 82b and the intersection line 82c.

(Step 14) Next, the arithmetic control module 22 scans the second object to be measured 83 in the same scan pattern 72 as the scan pattern of (Step 12). In FIG. 9, the second object to be measured 83 is circularly scanned for the necessary number of times, in at least one cycle, in such a manner that the circular scan 72 reaches two planes 83a and 83b of the second object to be measured 83. By scanning the second object to be measured 83, the point cloud data along a locus of the scan pattern 72 is acquired.

Here, both the first object to be measured 82 and the second object to be measured 83 are positioned within the image. Further, the image pickup module 28 has a field angle which is approximately equal to a deflection range by an optical axis deflector 24. Therefore, at the time of moving a distance measuring optical axis 46 from the first object to be measured 82 to the second object to be measured 83, driving only the optical axis deflector 24 can suffice, and a surveying instrument main body 3 does not have to be rotated.

(Step 15) When the point cloud data is acquired, the arithmetic control module 22 calculates the two planes 83a and 83b and the intersection line 83c based on the four continuous measuring points 73a, 73b, 73c and 73d. Further, based on the calculated two planes 83a and 83b and intersection line 83c, the arithmetic control module 22 calculates parameters of the two planes 83a and 83b and the intersection line 83c.

(Step 16) When the parameters of the two planes 82a and 82b and the intersection line 82c and the parameters of the two planes 83a and 83b and the intersection line 83c are calculated respectively, the arithmetic control module 22 calculates differences between the parameters of the two planes 82a and 82b and the parameters of the two planes 83a and 83b or the differences between the parameters of the intersection line 82c and the parameters of the intersection line 83c based on the design drawing data, and the like.

Here, the calculated differences mean, for instance, a distance between the plane 82b and the plane 83b, a tilt angle of the plane 83b with respect to the plane 82b, a rotation angle of the plane 83b with respect to the plane 82b, and the like in a case where the plane 82b and the plane 83b are set to face each other in the design drawing data.

Figure 10A:
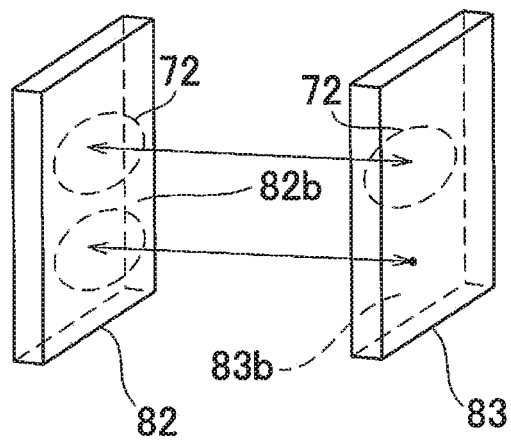
FIG. 10A and FIG. 10B are explanatory drawings to explain parameters of planes between two objects to be measured according to the second embodiment of the present invention.
Figure 10B:
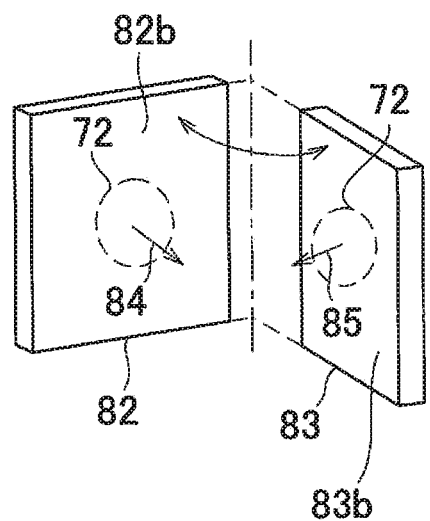
Figure 11:
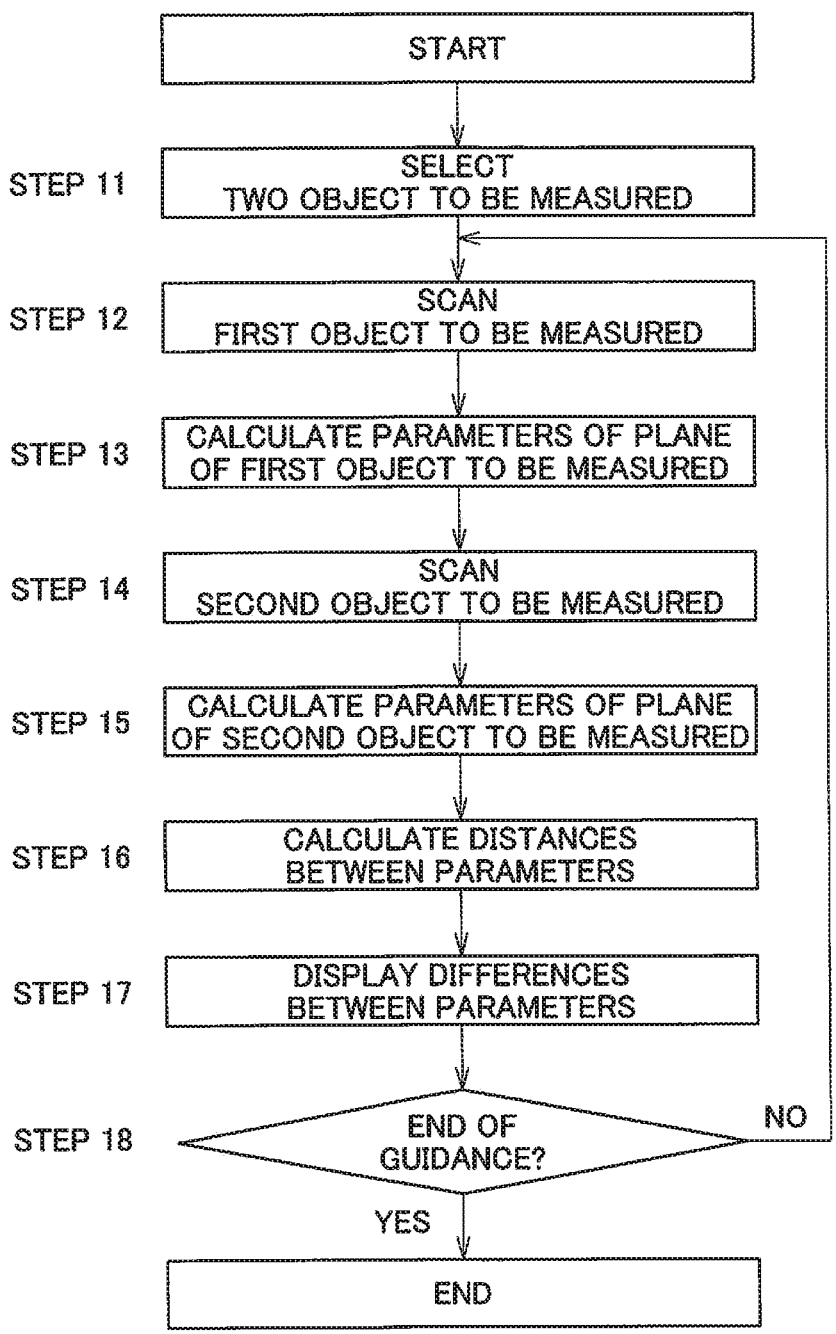
FIG. 11 is a flowchart to explain a guidance processing using the surveying instrument according to the second embodiment of the present invention.

FIG. 10A and FIG. 10B show a relationship between the plane 82b and the plane 83b in a simplified manner. As shown in FIG. 10A, the distance between the plane 82b and the plane 83b means the shortest distance between the plane 82b and the plane 83b. Further, as shown in FIG. 10B, the tilt angle and the rotation angle of the plane 83b with respect to the plane 82b means, for instance, an angle formed between a normal vector 84 of the plane 82b and a normal vector 85 of the plane 83b.

(Step 17) The calculated differences are displayed on a display module 34. The worker moves the first object to be measured 82 and the second object to be measured 83 manually or by a crane 79 in such a manner that the calculated differences have predetermined values based on the design drawing data.

(Step 18) The scan of the first object to be measured 82 and the second object to be measured 83 and the calculation of the parameters of the planes and the intersection line are alternately carried out by the arithmetic control module 22 per each cycle until the differences have the predetermined values based on the design drawing data. When the differences have the predetermined values based on the design drawing data, it is determined that the first object to be measured 82 and the second object to be measured 83 are guided to be the predetermined positional relationship, and the guidance processing of the first object to be measured. 82 and the second object to be measured 83 is terminated. It is to be noted that the predetermined values based on the design drawing data may be set to 0, and the guidance processing may be repeatedly carried out until the differences become 0.

As described above, in the second embodiment, the guidance is performed based on the differences between the parameters of the first object to be measured 82 and the parameters of the second object to be measured 83. That is, the calculated parameters here are the parameters with respect to one of the objects to be measured, and the parameters with respect to the horizontal or the vertical are not required. Therefore, the surveying instrument main body 3 does not have to be leveled up, and further, an attitude detector 5 is not required. For this reason, for instance, even in a state where the worker holds the surveying instrument main body 3 in an arbitrary attitude, the guidance processing can be carried out.

Further, since the first object to be measured 82 and the second object to be measured 83 are selected in the same image, only driving the optical axis deflector 24 can suffice at the time of alternately measuring the first object to be measured 82 and the second object to be measured 83. Therefore, a left-and-right motor 15 and an up-and-down motor 19 configured to rotate the surveying instrument main body 3 are no longer required, and an instrument configuration can be simplified.

Further, in the second embodiment also, since point cloud data of an entire circumference does not have to be acquired by a surveying instrument 1, the number of data to be acquired can be greatly reduced, and a calculation amount can be also decreased. Further, when the calculation amount is decreased, the guidance can be performed in real time, and the workability can be improved.

It is to be noted that, in the second embodiment, the first object to be measured 82 and the second object to be measured 83 are scanned in such a manner that a distance measuring light 44 reaches the two planes adjacent to each other. On the other hand, in case of obtaining a distance between the plane and the plane, an angle of one plane with respect to the other plane, and the like, only measuring the one plane of the first object to be measured 82 and the one plane of the second object to be measured 83 can suffice. Further, in case of obtaining a distance (the shortest distance) between prisms and a plane, measuring one point, and one plane can suffice as shown in FIG. 10A.

Further, in the second embodiment, the attitude detector 5 is not provided but, it is needless to say that the attitude detector 5 may be provided. When the attitude detector 5 is provided, since types of the parameters to be obtained increase, the attitude detector 5 can be attached and detached in accordance with an intended use.

It is to be noted that, in the first embodiment and the second embodiment, each object to be measured is scanned in such a manner that the distance measuring light 44 reaches two planes. On the other hand, each object to be measured may be scanned in such a manner that an intersection line of two side surfaces adjacent to each other, an intersection line between one side surface and a lower surface, or an intersection line between the other side surface and the lower surface is included, for instance.

In this case, parameters of the two adjacent side surfaces can be calculated, a lower end of the object to be measured can be also detected. Therefore, a lower end of the intersection line of the two adjacent side surfaces, that is, a corner part of the object to be measured can be also calculated. When the corner part is calculated, a difference of a height direction with respect to a reference position or the like can be also calculated, and hence the guidance processing can be carried out with higher accuracy.

Further, in the first embodiment and the second embodiment, each plane is measured by using the surveying instrument 1 adopting the optical axis deflector 24, and the parameters of the plane are calculated, but a normal laser scanner may be used.

In this case, a measurement range is limited in such a manner that only the object to be measured can be measured based on the design drawing data or based on the image picked-up by the image pickup module 28. The distance measuring light is deflected toward the limited measurement range, the distance measuring light is scanned, and the point cloud data is acquired. The calculation of the plane and the calculation of the parameters of the plane after the acquisition of the point cloud data are the same as the calculations in the first embodiment and the second embodiment.

When the measurement range is limited, the point cloud data of the entire circumference does not have to be acquired, and hence the number of the point cloud data to be acquired can be reduced. Therefore, since a calculation burden on the arithmetic control module 22 is reduced, the parameters can be calculated in real time, and the guidance processing can be performed in real time.

The invention claimed is:

1. A surveying instrument comprising a surveying instrument main body, wherein said surveying instrument main body comprises a distance measuring light projecting module configured to project a distance measuring light toward objects to be measured, a light receiving module configured to receive a reflected distance measuring light and to generate a light receiving signal, a distance measuring module configured to perform a distance measurement based on said light receiving signal, an optical axis deflector which is provided on a distance measuring optical axis and enables to two-dimensionally deflect said distance measuring optical axis, a projecting direction detecting module configured to detect a deflection angle of said distance measuring optical axis and to perform an angle measurement, an arithmetic control module configured to control a deflecting action of said optical axis deflector and a distance measuring action of said distance measuring module, and a display module configured to display calculation results by said arithmetic control module, and wherein said arithmetic control module is configured to scan at least one plane of said objects to be measured in a predetermined scan pattern in at least one cycle by said optical axis deflector, to calculate normal vectors of said plane, on which three continuous measuring points exist, based on said three continuous measuring points in point cloud data acquired along a locus of a scan, to calculate said plane based on said normal vectors, to calculate parameters of said plane based on a calculation result and to display the calculated parameters on said display module.

2. The surveying instrument according to claim 1, wherein said parameters of said plane include an information of at least an inclination and an inclining direction of said plane.

3. The surveying instrument according to claim 2, wherein said arithmetic control module is configured to perform a scan with said distance measuring light in such a manner that said distance measuring light reaches two adjacent planes of said objects to be measured, to calculate parameters of said two planes and intersection lines on which said two planes cross each other based on a scan result, to calculate differences between said parameters and a reference position set in advance, and to guide said objects to be measured to said reference position based on said differences.

4. The surveying instrument according to claim 2, both two objects to be measured are positioned in a deflection range of said optical axis deflector, and said arithmetic control module is configured to alternately scan at least one surface of each of said two objects to be measured, to calculate parameters of said surfaces of said two objects to be measured based on a scan result, respectively, and to guide said two objects to be measured based on differences between each of said parameters in such a manner that said two objects to be measured have a predetermined positional relationship.

5. The surveying instrument according to claim 2, wherein said optical axis deflector comprises a pair of rotatable optical prisms and motors configured to individually independently rotate said optical prisms, and said arithmetic control module is configured to control a rotating direction, a rotating speed, and a rotation ratio of said pair of optical prisms by a driving control of said motors, to control a deflection of said distance measuring optical axis by said optical axis deflector, and to make said distance measuring light two-dimensionally scan.

6. The surveying instrument according to claim 2, further comprising a supporting portion configured to support said surveying instrument main body rotatably in an up-and-down direction and a left-and-right direction, a rotation driving module configured to rotate said surveying instrument main body in the up-and-down direction and the left-and-right direction, and an angle detector configured to detect an up-and-down angle and a left-and-right angle of said surveying instrument main body.

7. The surveying instrument according to claim 2, further comprising an image pickup module having an image pickup optical axis parallel to a reference optical axis which is said distance measuring optical axis in a state of not being deflected by said optical axis deflector, wherein said arithmetic control module is configured to select said objects to be measured which are to be measured based on an image acquired by said image pickup module.

8. The surveying instrument according to claim 1, wherein said arithmetic control module is configured to perform a scan with said distance measuring light in such a manner that said distance measuring light reaches two adjacent planes of said objects to be measured, to calculate parameters of said two planes and intersection lines on which said two planes cross each other based on a scan result, to calculate differences between said parameters and a reference position set in advance, and to guide said objects to be measured to said reference position based on said differences.

9. The surveying instrument according to claim 8, wherein said parameters of said intersection line include an information of at least an inclination and an inclining direction of said intersection lines.

10. The surveying instrument according to claim 1, both two objects to be measured are positioned in a deflection range of said optical axis deflector, and said arithmetic control module is configured to alternately scan at least one surface of each of said two objects to be measured, to calculate parameters of said surfaces of said two objects to be measured based on a scan result, respectively, and to guide said two objects to be measured based on differences between each of said parameters in such a manner that said two objects to be measured have a predetermined positional relationship.

11. The surveying instrument according to claim 1, wherein said optical axis deflector comprises a pair of rotatable optical prisms and motors configured to individually independently rotate said optical prisms, and said arithmetic control module is configured to control a rotating direction, a rotating speed, and a rotation ratio of said pair of optical prisms by a driving control of said motors, to control a deflection of said distance measuring optical axis by said optical axis deflector, and to make said distance measuring light two-dimensionally scan.

12. The surveying instrument according to claim 1, further comprising a supporting portion configured to support said surveying instrument main body rotatably in an up-and-down direction and a left-and-right direction, a rotation driving module configured to rotate said surveying instrument main body in the up-and-down direction and the left-and-right direction, and an angle detector configured to detect an up-and-down angle and a left-and-right angle of said surveying instrument main body.

13. The surveying instrument according to claim 1, further comprising an image pickup module having an image pickup optical axis parallel to a reference optical axis which is said distance measuring optical axis in a state of not being deflected by said optical axis deflector, wherein said arithmetic control module is configured to select said objects to be measured which are to be measured based on an image acquired by said image pickup module.

14. The surveying instrument according to claim 13, wherein said arithmetic control module is configured to track said objects to be measured based on the image acquired by said image pickup module.

* * * * *